United States Patent [19]

Laszlo

[11] Patent Number: 4,575,911

[45] Date of Patent: Mar. 18, 1986

[54] METHOD AND APPARATUS FOR CONSTRUCTING TURBINE COMPONENTS

[75] Inventor: Oliver J. Laszlo, Dearborn, Mich.

[73] Assignee: Abdite Industries, Inc., Dearborn, Mich.

[21] Appl. No.: 699,706

[22] Filed: Feb. 8, 1985

[51] Int. Cl.⁴ .......... B21K 3/04; B23P 15/02; B23P 19/02; B23P 19/08

[52] U.S. Cl. .......... 29/156.8 B; 29/156.8 R; 29/432; 29/445; 29/464; 29/509; 29/525; 29/559; 29/798; 228/238; 416/189; 416/195

[58] Field of Search .......... 29/281.1, 281.5, 156.8 R, 29/156.8 B, 432, 445, 464, 509, 525, 559, 700, 798, 156.4 R; 228/238, 258; 415/189; 416/189, 191, 192, 195

[56] References Cited

U.S. PATENT DOCUMENTS

| | | | |
|---|---|---|---|
| 1,158,755 | 11/1915 | Weaver | 29/156.4 R |
| 1,284,088 | 11/1918 | Gilson | 29/156.8 B |
| 1,286,283 | 12/1918 | Gilson | 29/156.8 B |
| 2,000,692 | 5/1935 | Dimberg | 228/238 X |
| 2,197,335 | 4/1940 | Bohan | 29/156.8 R |
| 2,912,222 | 11/1959 | Wilkes, Jr. | 29/156.8 R X |
| 3,588,279 | 6/1971 | McGinnis | 416/191 |

Primary Examiner—Howard N. Goldberg
Assistant Examiner—Ronald S. Wallace
Attorney, Agent, or Firm—Krass & Young

[57] ABSTRACT

A method for mechanically securing turbine blades to mounting bands to form compressor stages. The turbine blades have end tangs which protrude through preformed slots in the bands. According to the method, a washer is pierced from stripstock and driven onto the end tang such that the tang stabs or pierces through the washer as the washer is driven flush against the band. In the preferred embodiment the washer stripstock is a composite; i.e., it includes its own brazing material which melts and braizes the blade to the band in a subsequent operation. An apparatus for carrying out the method comprises a blade seat, a stripstock retainer and a mechanically driven punch which substantially simultaneously punches the washer out of the stripstock and drives the washer onto the end tang of the blade.

4 Claims, 9 Drawing Figures

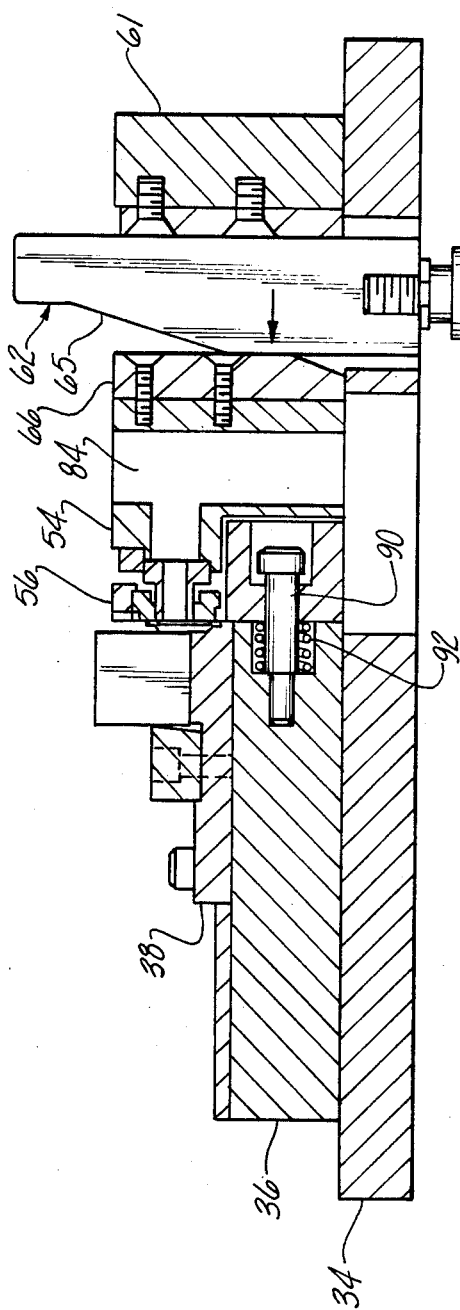
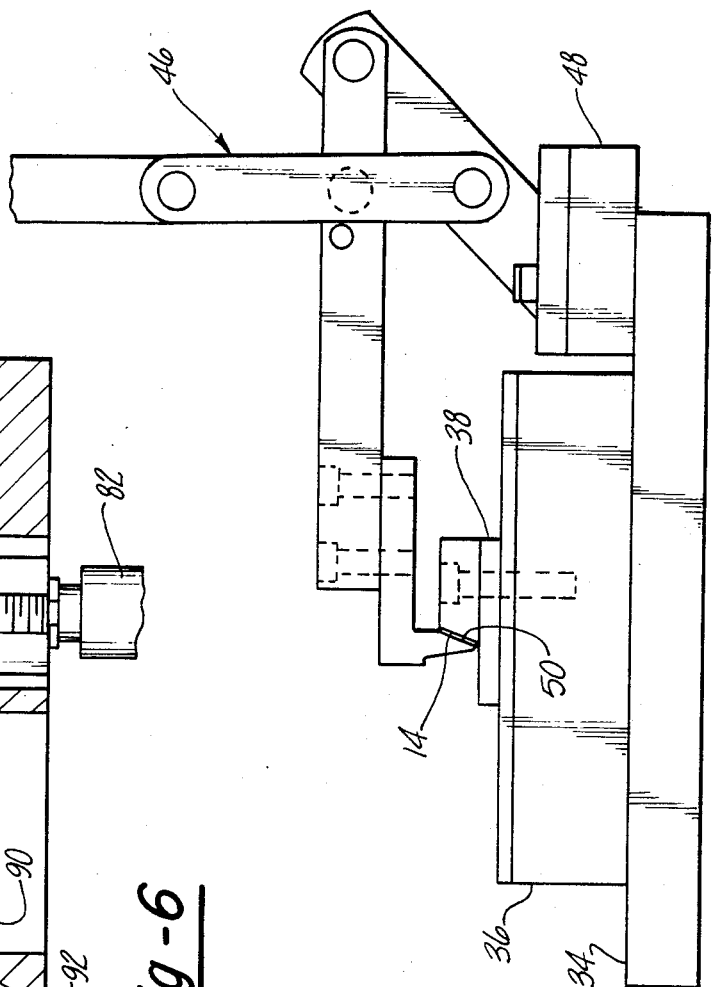
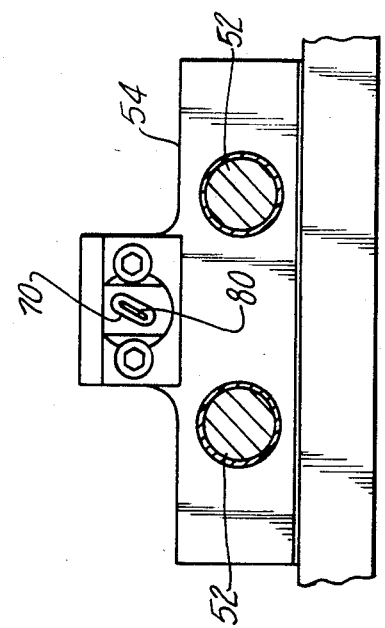

METHOD AND APPARATUS FOR CONSTRUCTING TURBINE COMPONENTS

INTRODUCTION

This invention relates to turbine components of the type comprising a plurality of radially-extending turbine blades mounted in a fully or partially circular mounting band and more particularly to methods and apparatus for precisely assembling the blades and mounting band components.

BACKGROUND OF THE INVENTION

A known and prior art turbine engine design includes stages, the principal components of which comprise a plurality of metal vanes or blades arranged in spaced-apart, radially-extending relationship with a circular mounting band, usually comprising two half circular parts which are assembled together during the construction of the engine.

According to known assembly techniques, the blades are assembled with the mounting bands by preforming a plurality of slots or holes in a mounting band, inserting the end tangs of the preformed blades in the slots and clipping the ends of the tangs which project through the outer surface of the mounting bands to hold the blades in place prior to and during a brazing operation. The holes or slots in the mounting stock are generally made somewhat larger than the tangs of the blades so that a loose or "sloppy" fit between the blades and the mounting stock exists. The assemblies are placed in a jig and each blade is individually adjusted in its position relative to the mounting band, the clip being required to hold the blade in the proper location prior to and during the brazing operation. The assemblies cannot withstand rough treatment between final adjustment and brazing since such rough treatment will disturb the precise location of one or more of the blades.

Another problem area associated with the prior art assembly technique lies in the addition of the brazing material to the assembly. The latest prior art technique is to use a small hairpin-shaped length of brazing wire and effectively clip this small piece of wire around the edge of the turbine blade immediately adjacent the inside surface of the mounting band. The article is then placed in a furnace where the brazing material melts and runs by capillary action into the interstices between the blade, blade tang and mounting stock material.

An alternative to the use of the clip is the use of a manual device similar to a hypodermic needle to inject a small amount of brazing material, preferably mixed with flux onto the proper location of the blade immediately prior to placing the turbine component in a brazing furnace.

Both operations depend on manual application and, therefore, involve costly labor.

SUMMARY OF THE INVENTION

The invention lies partly in an improved method for assembly of turbine blades to peripherally external or internal mounting bands and partly in an apparatus for carrying out the method.

In accordance with the method aspect of the invention, partial mounting bands, preferably half circles, are shaped and formed to exhibit a plurality of spaced apart slots into which turbine blade tangs may be inserted in a snug and close fitting relationship. The combination of the mounting band and blade or blades is then placed in a fixture and stripstock of suitable material is placed overlyingly adjacent the aperture or slot in the mounting band opposite the blade and force is applied to the assembly and to the stripstock so as to substantially simultaneously (a) separate a washer-like section of material from the stripstock which generally conforms to but is larger than the mounting structure aperture and, (b) driving the blade tang through the material removed from the stripstock so as to pierce a small slug of material from the separated stripstock such that the blade tang is driven fully through the aperture and into a precise mounting location and the material separated from the stripstock becomes a mounting washer or pressure fit fastener which is forced firmly against the surface of the mounting band opposite the turbine blade and which firmly holds the mounting blade against movement in any direction relative to the mounting band.

Experience has shown that the assembled units can be handled relatively roughly during shipment, packaging and so forth prior to brazing without significantly disturbing the relationship between the turbine blades and the mounting band structure. The apparatus is thereafter placed in a brazing furnace using either prior art techniques or the hereinafter described technique of supplying brazing material.

The result is a secure structure which can withstand rough treatment and the elimination of both the clipping and precision adjusting steps.

In accordance with a further aspect of the novel method, the stripstock from which the clamping washer is separated is plated with brazing material such as copper such that the washer which ends up on the turbine blade tang in the assembled structure carries its own brazing material in an advantageous arrangement for filling the interstices of the structure when placed in a brazing furnace. This eliminates another operation in the assembly step and reduces the labor costs associated with the assembly of a turbine device.

While the method and the apparatus for carrying out the method will be described with reference to a specific turbine component having a radially external half-round mounting band, it is to be understood that the principles of the invention are applicable to other structures including an arrangement whereby the mounting band is radially interior of the blade.

Referring now to the apparatus which is used for carrying out the invention, a device similar to a punch is provided whereby a suitably clamped and located combination of turbine blade and mounting band and suitable stripstock placed over the end of the blade tang which projects through the mounting band is subjected to the force of a punch which substantially simultaneously (a) separates a section of the stripstock from the strip which section is large enough to surroundingly encompass the entirety of the through-projecting tang and then drive the tang of the blade through the separated section of stripstock and firmly drive the separated section against the surface of the mounting band in surrounding relationship to the blade tang. The apparatus thereafter releases the assembly, and the mounting band and the stripstock are advanced for fixing another turbine blade in position.

In an alternative embodiment, the tang of the turbine blade is subjected to a swaging operation so as to still more firmly hold the turbine blade in place relative to the mounting band.

BRIEF DESCRIPTION OF THE DRAWING

FIG. 6 is a sectional view of the apparatus of FIG. 4;

FIG. 7 is an end view of the apparatus of FIG. 4 showing the clamping device in detail;

FIG. 8 is another sectional view showing slide pins; and

DETAILED DESCRIPTION OF THE PREFERRED EMBODIMENTS

Figure 1:
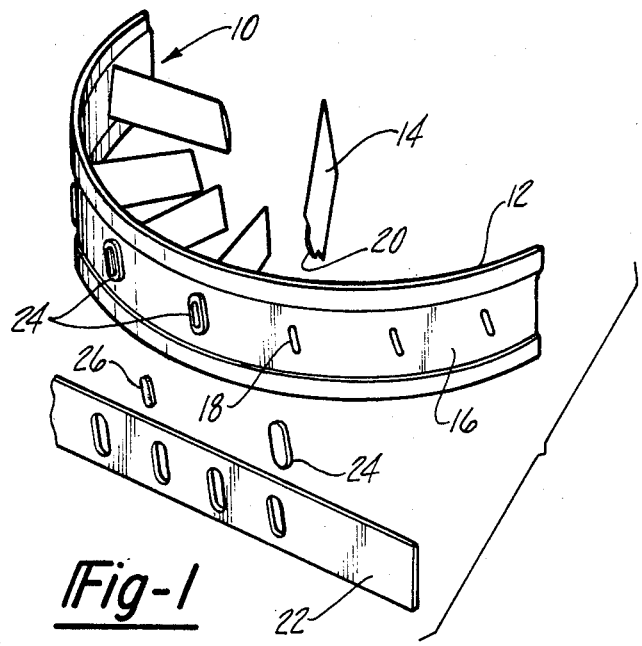
FIG. 1 is an exploded perspective view of a turbine stage undergoing the assembly process.

Referring first to FIG. 1 there is shown a partially completed turbine engine compressor stage 10 comprising in this instance a semi-circular stainless steel mounting band 12 carrying a plurality of radially oriented vanes or blades 14 of identical shape and size, all of which are oriented on radial lines toward a common center.

Figure 3:
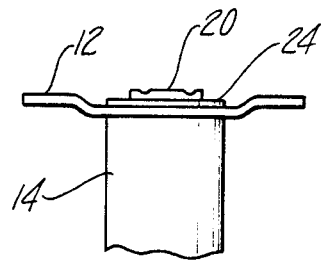
FIG. 3 is a sectional view of a turbine stage showing the build-up of blade, mounting band, securing washer and swaged tang.

In accordance with the invention the center section 16 of the band 12 is punched at regular intervals to form angled slots 18 which are adapted to snugly receive end tangs 20 of turbine blades 14. The depth or longitudinal dimension of the tang 20 is substantially greater than the thickness of the band 12 such that the tang 20 protrudes substantially through the opposite surface of the center section 16 when the shoulders of the blade adjacent the tang 20 are firmly against the band 12 as shown in FIG. 3.

In accordance with the process of the subject invention stainless steel stripstock 22 is utilized to supply, by a punching operation hereinafter described, a plurality of oblong washers 24 which are of sufficient dimension to fully surround a tang 20 of a blade 14 but small enough to fit within opposite boundaries of the center section 16 of band 12. As the washer 24 is separated from the stripstock 22, the blade 14 is held in a fixed location and braced against deformation with the end tang 20 protruding through the slot 18 in the band 12. The washer is urged toward the tang 20 in alignment therewith and driven by mechanical force onto the tang 20 such that a small slug 26 of washer stock is formed as the tang stabs or pierces through the washer 24. The washer 24 is forced flat against the section 16 of band 12 and thereafter mechanically holds the blade 14 in a percise location, secure against inadvertent movement due to rough handling and/or the rigors of shipment.

Figure 2:
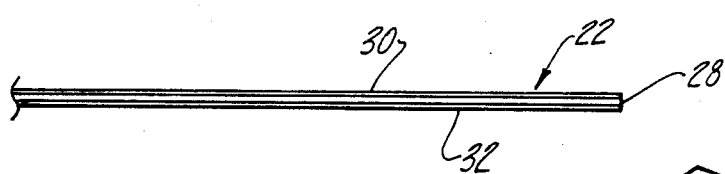
FIG. 2 is a side view of a preferred copper plated stripstock used in the assembly process of FIG. 1.
Figure 4:
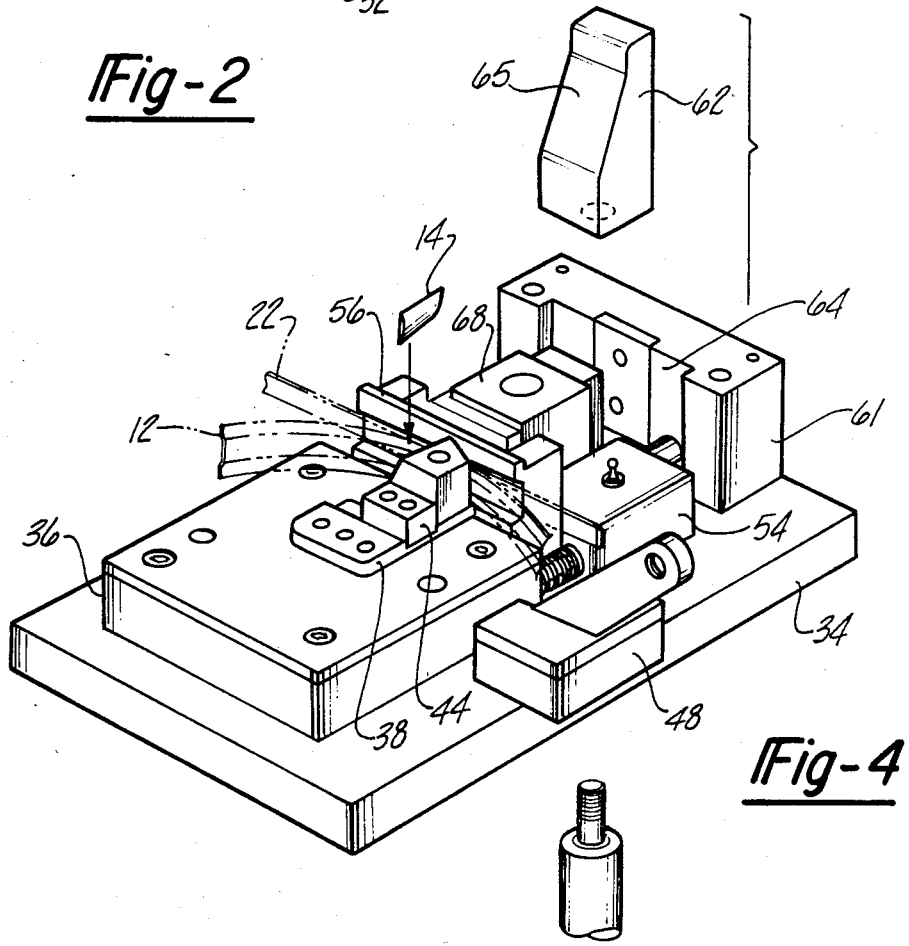
FIG. 4 is a perspective view of an apparatus for carrying out the process illustrated in FIG. 1.
Figure 5:
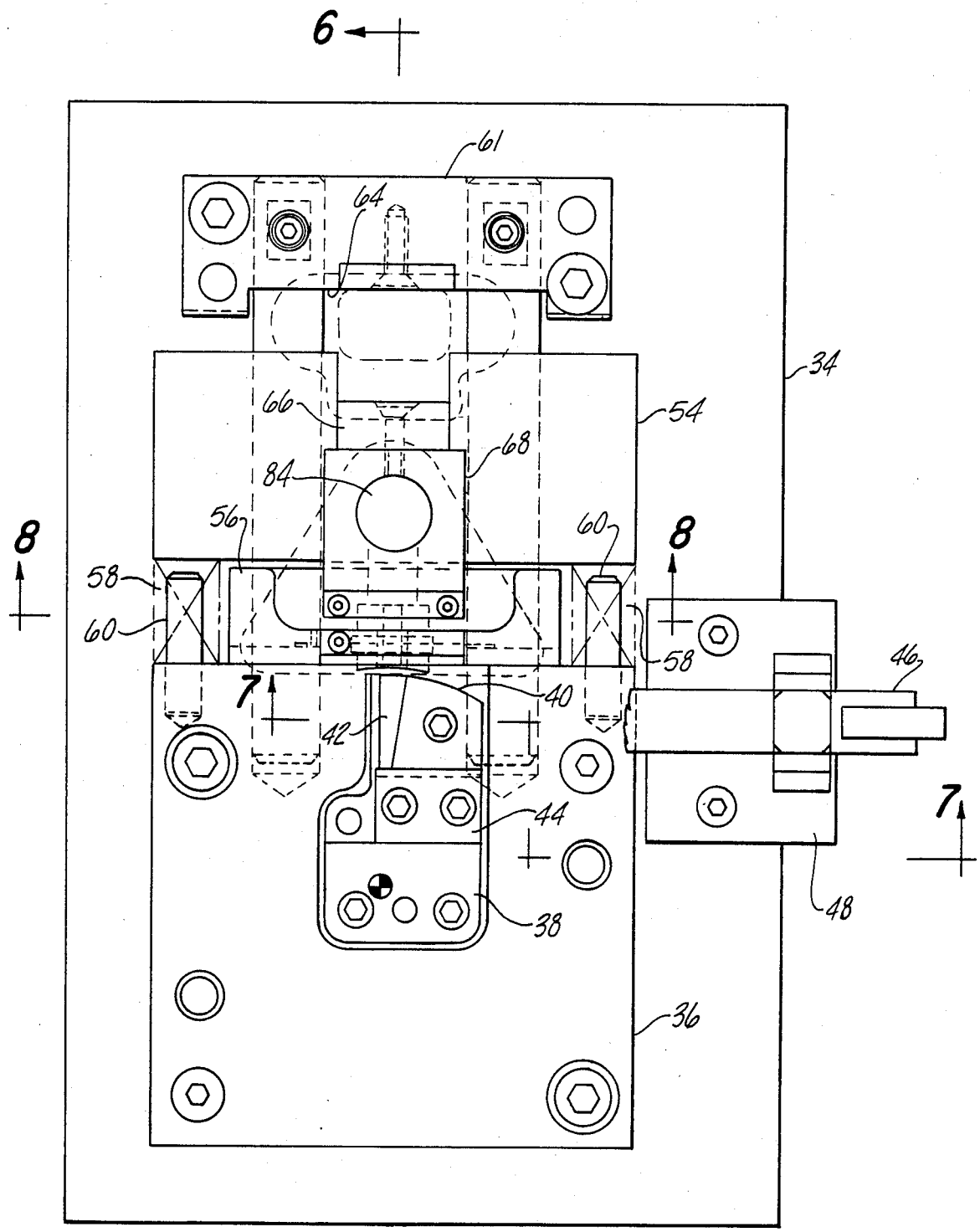
FIG. 5 is a plan view of the apparatus of FIG. 4.

In accordance with the invention the blades 14 are subsequently brazed into more secure mechanical engagement with the band 12. FIG. 2 illustrates a preferred stripstock 22 which facilitates the brazing operation. The stripstock 22 comprises a stainless steel core 28 of 0.020 inches thickness, a top plating 30 of copper which is approximately 0.001 inches thick and a bottom plating 32 which is approximately 0.005 inches thick for a total stripstock thickness of 0.026 inches. The stripstock 22 is oriented in the process of FIG. 1 so that the thicker copper plating 32 is on the outside or exposed surface of the washer 24 after it is in place on the end tang 20. Accordingly, when the entire finished turbine stage 10 is placed in a vacuum furnace at approximately 1950° F. the copper 30 and 32 melts and fills the interstices between the blade 14 and the band 12 with brazing material. Since the thicker coating 32 of copper is on the outside, this provides the majority of the brazing material which fills the interstices.

It is to be understood that the asymmetric arrangement of stripstock material shown in FIG. 2 is merely representative of the preferred plating arrangement and that other arrangements including equal thickness coatings on both sides and arrangments involving a coating on only one side of the stripstock 22 may also be utilized.

FIG. 3 shows an arrangement which contemplates extremely severe and rough handling of the turbine stages 10 between the blade installation procedure described with reference to FIG. 1 and the brazing operation described with reference to FIG. 2. Under these circumstances it is advisable to swage the end tang 20 of the completed assembly so as to flatten the tang near the opposite ends thereof over the washer 24 to provide a strong rivet-like mechanical securement of the tang and washer relative to the band 12. A variety of punching or striking operations can be used for this purpose as will be apparent to those skilled in the art.

Referring now to FIGS. 4-9 an apparatus for carrying out the process of FIG. 1 is illustrated. This apparatus is designed for utilization as a bench unit placed at an oblique angle before an operator who feeds band, blade and stripstock into the apparatus by hand. It will be apparent to those skilled in the mechanical arts that more automated arrangements are also possible.

The bench top apparatus of FIGS. 4-7 comprises a ⅜ inch steel base plate 34 which is adapted to be secured down securely to the bench by means of machine screws or other suitable fasteners. Mounted on the base plate 34 is a blade retainer bed plate 36 carrying a blade retainer 38. The top portion 40 of which is machined into a smooth curved surface which matches the radius of the mounting band 12 so that the band may be placed in position to receive a blade 14 as hereinafter described. The top portion 40 of blade retainer 38 is also machined to provide a blade seat 42 which is configured in a compound radius to provide a precise match with the exterior surface of a blade 14 when in condition and configuration for final assembly. A brace 44 is mounted on seat 38 to prevent flexure of element 40 during a punching operation hereinafter described. A clamp 46 is mounted on a clamp bed plate 48 which is in turn mounted on the base 34. The clamp is manually operated and is provided with a clamp face 50 which is configured precisely to match the interior surface of the blade 14 such that between the face 50 of the clamp and the face of the seat 42, the blade 14 is held against any distortion during the longitudinal loading which results from the washer installation process previously described.

The upper portion of plate 36 carries two parallel and longitudinally extending slide pins 52 which slidingly receive thereon a punch holder/driver 54 and a stripstock retainer 56, the holder/driver 54 and the retainer 56 being longitudinally movable relative to the plate 36 and also independently movable on the pins 52 relative to one another. Smaller pins 60 mounted on the top of the plate 36 provide retainers for return springs 58 which urge the unit 54 away from the plate 36 as hereinafter described.

Figure 9:
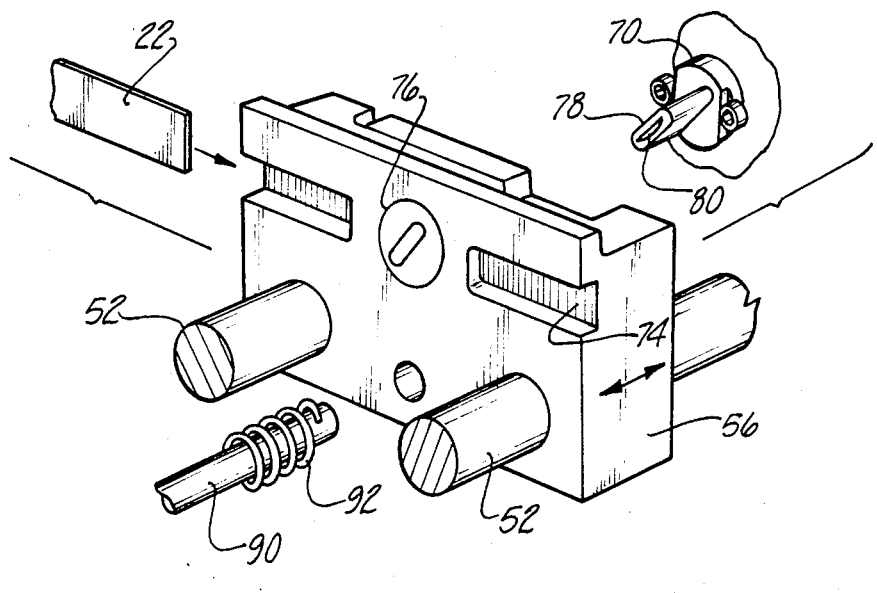
FIG. 9 is a perspective view of a stripstock retainer detail in the apparatus of FIGS. 4 and 5.

A stop assembly 61 is firmly screwed to the plate 34 to provide a reaction base for a cam 62 which operates in a slot 64 formed in the stop 61. The opposite surface 65 of cam 62 is angled and slides in abutting contact with a fixed cam bar 66 which is mounted on a punch base 68 held between the left and right blocks of the holder/driver unit 54. Base 68 carries a punch 70 which is aligned with a button 76 in the stripstock retainer 56 as best shown in FIG. 9. The punch 70 and particularly the hollow extension 78 thereof which defines the shape and size of the washer 24 is aligned precisely with the tang 20 of the blade 14 as it rests in the seat 42 of unit 38, 40.

A third slide pin 90 and compression spring 92 is disposed between plate 36 and retainer 56 to return the retainer to its home position after a punching operation.

Looking to FIGS. 8 and 9 the details of the stripstock retainer 56 and the punch 70 are more clearly shown. The stripstock retainer 56 which rides on pins 52 is provided with a channel 74 which firmly holds the stripstock 22 but permits it to be manually indexed or fed from right to left to perform the process described with reference to FIG. 1. The stripstock 22, when held within the channel 74 of the retainer 56 passes directly in front of the punch button 76 and, hence, the punch 70 when in the rest configuration illustrated in FIGS. 4 and 5. When the cam 62 is operated by means of air cylinders 82 elements 54, 66, 68 and 70 are driven toward the combined unit 38, 40, 42, 44 to separate the washer 24 out of the stripstock 22 and drive the end tang 20 of the blade 14 through the separated washer and finally to seat the washer 24 flush against the center section 16 of the band 12 as illustrated in FIG. 3.

The first increment of movement drives the hollow section 78 of the punch 70 against the stripstock; i.e., unit 54 moves relative to unit 56, such relative movement being permitted by the independent mounting of the two units on the pins 52. Both units 54 and 56 are then driven toward unit 38 to separate out the washer 24 and substantially simultaneously drive the washer over the end tang 20 of the blade 14. As noted with reference to FIGS. 8 and 9, the punch portion 78 is hollowed out to provide a through channel 80 which corresponds in configuration to the end tang 20 and a small slug 26 of washer stock is pushed through the punch 70 into a receptacle 84.

When the air cylinder is deactivated, the cam 62 returns to the rest position and allows the return springs 58 to push unit 54 back to the rest position against the stop 61. At this time the clamp 46 is released, the band 12 is indexed from right to left, the stripstock 22 is indexed from right to left, another blade is placed against the seat 42 and the clamp 46 is again locked in position. The air cylinder 82 is again activated and another strike is made to secure another blade 14 in position on the band 12. This process is repeated until the entire band is filled.

The completed unit 10 is now ready for brazing in accordance with the description previously given with respect to FIGS. 1 and 2.

If desired or if made necessary by the process of long shipment or rough handling, the swaging operation described with reference to FIG. 3 may be carried out between the blade/band assembly process and the brazing step.

I claim:

1. A method of assembling a turbine blade or the like to a metallic mounting element wherein the blade includes an end tang and the mounting element has a slot-like aperture to receive the end tang therethrough and the end tang is of sufficient depth to project fully through and beyond the mounting element, said method comprising the steps of:
   A. placing a strip of composite material adjacent a surface of the mounting element opposite the turbine blade and overlying the aperture;
   B. separating out of said strip a section of material larger than the aperture; and
   C. driving the tang through the separated section while urging the section into abutting contact with said mounting element surface.

2. A method as described in claim 1 wherein the composite material includes a core portion of high melting point material and a coating of relatively low melting point material, the process including the further and subsequent step of placing the turbine blade and mounting element combination in a furnace and causing the lower melting temperature material of the composite to melt and braze the blade to the mounting element.

3. A method as described in claim 1 including the further step of mechanically deforming the end tang to provide a further mechanical interlock between the end tang and the separated section.

4. Apparatus for assembling turbine blades and mounting bands wherein said blades are of the type having a body and an end tang and said mounting bands are of the type having spaced slots for receiving said end tangs, the apparatus comprising:
   means defining a seat for a blade and for receiving said band in an assembly position with said end tang extending through a slot;
   retainer means for holding stripstock material from which to form washers for surroundingly engaging said end tangs which protrude through said bands;
   punch means for separating washers out of said stripstock and driving said washers onto said protruding end tang portions and flush against the surface of said band to mechanically secure said blade to said band.

* * * * *